Patented Mar. 26, 1940

2,195,150

UNITED STATES PATENT OFFICE 2,195,150

STABILIZATION OF PHOTOGRAPHIC EMULSIONS

John David Kendall, Ilford, England, assignor to Ilford Limited, Ilford, Essex, England, a British company No Drawing. Application June 1, 1939, Serial No. 276,869. In Great Britain June 16, 1938

14 Claims. (Cl. 95—7)

This invention relates to the stabilization of light-sensitive silver halide emulsions.

Photographic silver halide emulsions are relatively delicate and when stored under unfavourable conditions they may deteriorate rapidly. The deterioration may take several forms such as dis-colouration, growth of chemical fog or an undesirable change of gradation or sensitivity.

Hitherto, many substances have been proposed as additions to emulsions for the purpose of stabilizing them or rendering them less sensitive to deterioration without impairing their photographic qualities; such additions include imidazoles and like compounds forming silver salts, the solubility of which does not exceed that of silver chloride, quinine, and quinidine and secondary and tertiary aromatic and aromatic-aliphatic amines.

In my co-pending U. S. application, No. 63,451, filed February 11, 1936, corresponding to British Patent No. 452,043, I have described the addition of 2-mercapto-4-hydroxy-pyrimidine, its alkyl, aralkyl and aryl substitution derivatives, compounds which are tautomeric to such compounds and also the alkali metal and ammonium salts of such compounds. Also, in my co-pending U. S. application No. 247,109, filed December 21, 1938, I have described the addition of a 2-thio-4-keto-tetra-hydropyrimidine which is substituted in the 1 or 3 position with a hydrocarbon radicle or a substituted hydrocarbon radicle and may be substituted in the 5 and/or 6 positions with a hydrocarbon radicle or a substituted hydrocarbon radicle, or a corresponding compound which has a tautomeric form and has an ammonium radicle or a metal or a hydrocarbon radicle attached to the oxygen or sulphur atoms to form a salt, ether or thioether.

It is an object of the present invention to provide a new range of stabilizing compounds and it is a further object of the invention to provide light sensitive silver halide photographic materials which are stabilized against changes during storage by the use of the new stabilizing compounds. Other objects of the invention will appear hereinafter.

According to the present invention, in photographic material comprising a light sensitive silver halide emulsion and a support (i. e. a glass plate, film, paper or the like) for the emulsion, the emulsion is stabilized against changes during storage by the presence, in fog-inhibiting amounts, of a 2-selenomercapto-4-hydroxy pyrimidine or of a substitution compound derived from one of the four following tautomeric formulae possible for 2-seleno-mercapto-4-hydroxy pyrimidine:

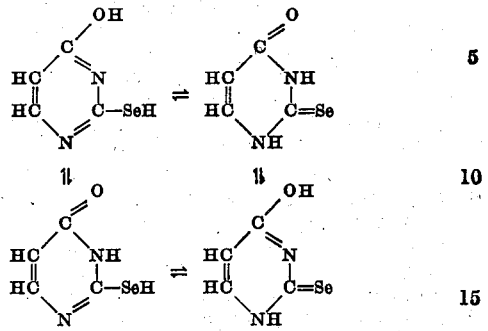

the substituent group or groups being hydrocarbon or substituted hydrocarbon groups.

It is to be understood that the invention includes the use of substituted compounds in which the substituent group or groups replace any of the hydrogen atoms in the above formulae. Substituent groups, such as methyl groups, will not wander in the same way as hydrogen atoms.

In the case of those compounds which will form salts, that is those compounds having a SeH or OH group, their salts, and preferably their water-soluble salts, may be used for the purpose of the present invention. Such salts may be metal salts, preferably alkali-metal salts, or ammonium salts.

The new series of stabilizing compounds, therefore, comprises 2 - seleno - mercapto- 4 -hydroxy pyrimidine itself, N-substituted derivatives of tautomeric forms of 2-seleno-mercapto-4-hydroxy pyrimidine where the N-substituents are hydrocarbon or substituted hydrocarbon radicles, corresponding compounds to each of the above where the 5 and/or 6 positions are substituted with a hydrocarbon radicle or substituted hydrocarbon radicle and corresponding compounds to any of the above in which an ammonium radicle, a metal or a hydrocarbon radicle is attached to the oxygen or selenium to form a salt, ether or selenoether.

The preferred compounds according to the invention are 2-selenomercapto-4-hydroxy-pyrimidine and the tautomers thereof which contain keto groups ("keto-tautomers") and which are substituted in the 3-position by a hydrocarbon or substituted hydrocarbon group.

The compound 2-selenamercapto-4-hydroxy-pyrimidine may be prepared by the condensation of selenourea and ethyl sodioformylacetate. Specific examples of other compounds which may be employed and their methods of preparation are as follows:

6-methyl-2-selenomercapto-4-hydroxy-pyrimidine, which may be prepared by the condensation of selenourea and ethyl sodioacetoacetate.

5.6-dimethyl-2-selenomercapto-4-hydroxy-pyrimidine which may be prepared by the condensation of selenourea and ethyl sodiomethylacetoacetate.

6-phenyl-2-selenomercapto-4-hydroxy-pyrimidine, which may be prepared by the condensation of selenourea and ethyl sodiobenzoylacetate.

6-methyl-5 - ethyl - 2 - selenomercapto - 4-hydroxy-pyrimidine, which may be prepared by the condensation of selenourea and ethyl sodioethylacetylacetate.

By employing N-substituted selenoureas in the condensation with β-keto esters, N-substitution derivatives of the various tautomeric forms of 2-selenomercapto-4-hydroxy pyrimidine may be obtained. Thus, for example, 3-ethyl-4-keto-6-methyl-2-selenotetrahydropyrimidine may be prepared by condensing N-ethyl selenourea with ethyl acetate in the presence of a small amount of sodium in absolute alcohol. N-ethyl selenourea may be prepared by passing hydrogen selenide through an etherial solution of ethyl cyanamide kept cool in ice. If selenoureas are condensed with anthranilic or N-substituted anthranilic esters the corresponding quinazoline derivatives may be obtained.

As indicated above, the compounds employed may be derivatives of 2-selenomercapto-4-hydroxy pyrimidine in which hydrogen atoms have been replaced by hydrocarbon or substituted hydrocarbon radicles. Examples of hydrocarbon radicles are alkyl radicles, e. g. methyl, ethyl, propyl, butyl and higher alkyl radicles, aryl radicles, e. g. phenyl and naphthyl radicles and aralkyl radicles, e. g. the benzyl radicle.

The 5 and 6 positions may be substituted so as to form the quinazoline type of compound. Such hydrocarbon radicles may themselves be substituted, for instance, aryl groups, e. g. phenyl and naphthyl groups may be substituted by hydroxy, amino, nitro, sulphonic acid or halogen radicles.

It is found that emulsions having the stabilizers of this invention in intimate contact therewith show improved keeping qualities (that is, a reduction in the fog produced by incubation or by long storage) whilst changes in contrast and speed to which some emulsions are prone, appear in some cases to be eliminated or diminished. Further, the action of the stabilizer in many cases is to reduce the fog in freshly prepared emulsions.

Photographic materials treated according to the present invention also show improvement in the depth of blacks produced on development.

In a preferred embodiment of the invention, the new stabilizing compounds are added to the silver halide emulsion just prior to coating the emulsion on its support. Conveniently the compounds may be added as a 1% solution in water, alcohol, aqueous alcohol, or a water soluble glycol ether, the quantity added varying from 1 to 10 ccs. of such a solution per pound of emulsion.

The following tables illustrate the stabilizing effect of the compounds of the present invention. For the "gas-light" tests, the emulsion employed was a normal unwashed silver chloride emulsion of the type normally employed for development papers as used for printing by contact and containing 2.20 grams of silver per 150 ccs. of emulsion. For the "bromide" tests the emulsion employed was a washed normal silver bromide emulsion of the type employed in development papers as used for enlarging and containing 3.60 grams of silver per 150 ccs. of emulsion.

In both series of tests control strips, i. e. strips coated with emulsion containing no addition, and strips coated with emulsion containing a stabilizer in a quantity as shown in the tables were prepared in quadruplicate and two of each were developed straight away without exposure under standard conditions, and the remainder were incubated for ten days at 115° F. and approximately 40 relative humidity and then developed without exposure.

For the "gas-light tests" development was effected for 1½ minutes and 5 minutes at 65° F. with a metol-hydroquinone developer commonly used for chloride emulsions, of the following composition:

Mono methyl-p-amino phenol sulphate
_____grams__ 3
Sodium sulphite crystals_____do____ 100
Hydroquinone _____do____ 12.5
Sodium carbonate crystals_____do____ 187.5
Potassium bromide_____do____ 0.75
Water to make a bulk of_____ccs__ 2000

For the "bromide tests" development was effected for 4 minutes and 10 minutes at 65° F. with a metol-hydro-quinone developer commonly used for silver bromide emulsions of the following composition:

Mono methyl-p-amino phenol sulphate
_____grams__ 0.75
Sodium sulphite crystals_____do____ 25
Hydroquinone _____do____ 3
Sodium carbonate crystals_____do____ 40
Potassium bromide_____do____ 1
Water to make a bulk of_____ccs__ 500

This developer was diluted with an equal volume of water before use.

The density of fog appearing on the developed strips was measured in a densitometer, the readings being given in the table:

Table I

| Test | Stabilizer additions, quantity of stabilizer added as spirit solution to 150 ccs. of emulsion | Gaslight tests | | | |
|---|---|---|---|---|---|
| | | 1½ mins. | | 5 mins. | |
| | | Orig. | Inc. | Orig. | Inc. |
| Control | | .01 | .50 | .11 | 1.16 |
| 6-methyl-2-seleno-mercapto-4-hydroxy pyrimidine | 1.4 ccs. 1:500 | .01 | .15 | .10 | .47 |
| | 14.0 ccs. 1:500 | .02 | .07 | .10 | .29 |
| Control | | .01 | .50 | .11 | 1.16 |
| 2-selenomercapto-4-hydroxy-pyrimidine | 2.4 ccs. 1:800 | .00 | .08 | .10 | .39 |
| | 16.8 ccs. 1:800 | .02 | .07 | .11 | .29 |
| Control | | .02 | .09 | .47 | .58 |
| 5:6-dimethyl-2-selenomercapto-4-hydroxy-pyrimidine | 0.88 ccs. 1:300 | .02 | .05 | .12 | .18 |
| | 4.40 ccs. 1:300 | .01 | .05 | .15 | .15 |
| Control | | .02 | .09 | .47 | .58 |
| 6-phenyl-2-selenomercapto-4-hydroxy pyrimidine | 6.0 ccs. 1:2,000 | .02 | .05 | .15 | .19 |
| | 30.0 ccs. 1:2,000 | .03 | .03 | .12 | .15 |

Table II

| Test | Stabilizer additions, quantity of stabilizer added as spirit solution to 150 ccs. of emulsion | Bromide tests | | | |
|---|---|---|---|---|---|
| | | 4 mins. | | 10 mins. | |
| | | Orig. | Inc. | Orig. | Inc. |
| Control | | .00 | .17 | .02 | .33 |
| 6-methyl-2-selenomercapto-4-hydroxy pyrimidine | {1.4 ccs. 1:500 {14.0 ccs. 1:500 | .01 .01 | .02 .02 | .02 .03 | .08 .07 |
| Control | | .00 | .17 | .02 | .33 |
| 2-selenomercapto-4-hydroxy-pyrimidine | {2.4 ccs. 1:800 {16.8 ccs. 1:800 | .01 .03 | .00 .04 | .01 .04 | .04 .06 |
| Control | | .02 | .11 | .08 | .27 |
| 5:6-dimethyl-2-selenomercapto-4-hydroxy-pyrimidine | {0.88 ccs. 1:300 {4.40 ccs. 1:300 | .00 .02 | .06 .05 | .09 .11 | .14 .11 |
| Control | | .02 | .11 | .08 | .27 |
| 6-phenyl-2-selenomercapto-4-hydroxy pyrimidine | {6.0 ccs. 1:2,000 {30.0 ccs. 1:2,000 | .01 .01 | .04 .05 | .08 .06 | .10 .11 |

Although it is preferred to incorporate the stabilizing compound in the light sensitive emulsion, it may be incorporated in various fog-inhibiting relationships with the emulsion. Thus it may be incorporated alternatively or in addition, in the support, in a separate layer, (e. g. a gelatine layer) coated on top of the emulsion, or in an intermediate layer (e. g. a layer of gelatine or synthetic resin) between the emulsion and support, for example, in the baryta coating commonly used in photographic papers; or the finished photographic material may be bathed in a solution of the stabilizing compound. Also the stabilizing compound may be incorporated in the wrapping materials or other materials used in juxtaposition to the emulsion. The present invention includes such modifications.

I claim:

1. Photographic material comprising a light sensitive silver halide emulsion having in fog-inhibiting relationship therewith a compound taken from the class consisting of the 2-selenomercapto-4- hydroxy pyrimidines, their tautomeric compounds and their salts.

2. A photographic element comprising a support and a light sensitive silver halide emulsion having in fog-inhibiting relationship therewith a compound taken from the class consisting of the 2-selenomercapto-4-hydroxy pyrimidines, their tautomeric compounds and their water-soluble salts.

3. A photographic element comprising a support bearing a light sensitive silver halide emulsion having in intimate contact therewith in fog-inhibiting amounts a compound taken from the class consisting of 2-seleno-mercapto-4-hydroxy pyrimidines, their tautomeric compunds and their water-soluble salts.

4. A photographic element comprising a support bearing a light sensitive silver halide emulsion containing, in fog-inhibiting amount, a compound taken from the class consisting of 2-selenomercapto-4-hydroxy pyrimidines, their tautomeric compounds and their water-soluble salts.

5. Photographic material comprising a light sensitive silver halide emulsion and a support for the emulsion wherein the emulsion includes, in fog-inhibiting amount, a keto tautomer of a 2-selenomercapto-4-hydroxy pyrimidine containing a hydrocarbon substituent group in the 3 position.

6. Photographic material comprising a light sensitive silver halide emulsion and a support for the emulsion wherein the emulsion includes, in fog-inhibiting amount, a water-soluble salt of a keto tautomer of a 2-selenomercapto-4-hydroxy pyrimidine containing a hydrocarbon substituent group in the 3 position.

7. Photographic material comprising a light sensitive silver halide emulsion and a support for the emulsion wherein the emulsion includes, in fog-inhibiting amount, a water-soluble salt of a keto tautomer of a 2-selenomercapto-4-hydroxy pyrimidine containing an alkyl group in the 3 position.

8. Photographic material comprising a light sensitive silver halide emulsion and a support for the emulsion wherein the emulsion includes, in fog-inhibiting amount, a 2-selenomercapto-4-hydroxy pyrimidine in one of its tautomeric forms and containing a hydrocarbon substituent group in at least one of the 5 and 6 positions.

9. Photographic material comprising a light sensitive silver halide emulsion and a support for the emulsion wherein the emulsion includes, in fog inhibiting amount, a 2-selenomercapto-4-hydroxy pyrimidine in one of its tautomeric forms, and containing a substituent hydrocarbon grouping linking the 5 and 6 positions.

10. Photographic material comprising a light sensitive silver halide emulsion and a support for the emulsion wherein the emulsion includes, in fog inhibiting amount, a keto tautomer of a 2-selenomercapto-4-hydroxy pyrimidine containing a substituent hydrocarbon grouping linking the 5 and 6 positions and a hydrocarbon substituent group in the 3 position.

11. Photographic material comprising a light sensitive silver halide emulsion and a support for the emulsion wherein the emulsion includes, in fog inhibiting amount a keto tautomer of a 2-selenomercapto-4-hydroxy pyrimidine containing a substituent hydrocarbon group in the 3-position and containing a substituent hydrocarbon group in one of the 5 and 6 positions.

12. A photographic element comprising a light sensitive silver halide emulsion and a support for the emulsion, said emulsion containing 2-selenomercapto-4-hydroxyl pyrimidine in fog inhibiting amount.

13. A photographic element comprising a light sensitive silver halide emulsion and a support for the emulsion, said emulsion containing 6-methyl-2-selenomercapto-4-hydroxy pyrimidine in fog inhibiting amounts.

14. A photographic element comprising a light sensitive silver halide emulsion and a support for the emulsion, said emulsion containing 5,6-dimethyl-2-selenomercapto-4-hydroxy pyrimidine in fog inhibiting amounts.

JOHN DAVID KENDALL.